US006470182B1

(12) United States Patent  
Nelson

(10) Patent No.: US 6,470,182 B1
(45) Date of Patent: *Oct. 22, 2002

(54) MOBILE STATION ROAMING IN A MULTIPLE SERVICE PROVIDER AREA

(75) Inventor: Roderick Nelson, Redmond, WA (US)

(73) Assignee: AT&T Wireless Service, Inc., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/663,097

(22) Filed: Sep. 15, 2000

Related U.S. Application Data

(63) Continuation of application No. 09/135,299, filed on Aug. 17, 1998.

(51) Int. Cl.[7] .................................................. H04Q 7/20
(52) U.S. Cl. ..................... 455/432; 455/440; 455/450; 455/455; 455/456; 370/331
(58) Field of Search ................. 455/422, 423, 455/432, 434, 435, 436, 438, 440, 442, 443, 445, 456; 370/328, 329, 331–334

(56) References Cited

U.S. PATENT DOCUMENTS

| 4,750,151 A | 6/1988 | Baus ........................... 700/90 |
| 4,788,583 A | 11/1988 | Rubin ....................... 340/7.21 |
| 4,903,320 A | 2/1990 | Hanawa ...................... 455/434 |
| 4,905,301 A | 2/1990 | Krolopp et al. .............. 455/434 |
| 4,916,728 A | 4/1990 | Blair ......................... 455/455 |
| 5,020,091 A | 5/1991 | Krolopp et al. .............. 455/551 |
| 5,040,237 A | 8/1991 | Barnes et al. ................. 455/8 |
| 5,101,500 A | 3/1992 | Marui ....................... 340/7.42 |
| 5,159,625 A | 10/1992 | Zicker ........................ 455/432 |
| 5,203,015 A | 4/1993 | George ........................ 455/514 |
| 5,276,905 A | 1/1994 | Hurst et al. .................. 455/435 |
| 5,369,781 A | * 11/1994 | Comroe et al. ................. 455/15 |
| 5,404,355 A | 4/1995 | Raith ......................... 370/311 |
| 5,406,643 A | 4/1995 | Burke et al. ................. 709/243 |
| 5,412,375 A | 5/1995 | Wood ......................... 455/451 |
| 5,420,908 A | 5/1995 | Hodges et al. ............... 455/411 |
| 5,430,761 A | * 7/1995 | Bruckert et al. ............. 375/144 |
| 5,442,806 A | 8/1995 | Barber et al. ............... 455/435 |
| 5,463,675 A | 10/1995 | Gerzberg .................... 455/551 |
| 5,479,484 A | 12/1995 | Mukerjee et al. ........... 455/432 |
| 5,483,684 A | 1/1996 | Ono et al. ................. 455/161.2 |
| 5,504,803 A | 4/1996 | Yamada et al. ............. 455/426 |
| 5,509,052 A | 4/1996 | Chia et al. ................. 455/465 |
| 5,513,242 A | 4/1996 | Mukerjee et al. ........... 455/403 |

(List continued on next page.)

FOREIGN PATENT DOCUMENTS

| CA | 2115877 | 11/1994 |
| EP | 0 459 344 A1 | 12/1991 |
| EP | 0 510 322 A2 | 10/1992 |
| EP | 0781 064 A2 | 6/1997 |
| GB | 2 257 334 A | 1/1993 |

OTHER PUBLICATIONS

"System and Selection for Preferred Roaming Stage 1 Description—Baseline Text," Jun. 10, 1996.

*Primary Examiner*—Lester G. Kincaid
*Assistant Examiner*—Charles Craver
(74) *Attorney, Agent, or Firm*—Oliff & Berridge, PLC

(57) ABSTRACT

A method and apparatus for controlling roaming in a multiple service provider environment. When a mobile station determines that it can no longer obtain acceptable service from a primary service provider, the mobile station determines whether it is operating at the periphery of the primary service provider coverage area. If it is, then the mobile station is permitted to obtain service from a secondary service provider (i.e. roam). If it is determined that the mobile station is not operating at the periphery of the primary service provider coverage area, then the mobile station is prevented from roaming for a time period which allows the mobile station to emerge from a presumed coverage hole.

25 Claims, 5 Drawing Sheets

U.S. PATENT DOCUMENTS

| | | |
|---|---|---|
| 5,513,247 A | 4/1996 | Mukerjee et al. ............ 455/403 |
| 5,517,677 A | 5/1996 | Moon ...................... 455/161.1 |
| 5,524,135 A | 6/1996 | Mizikovsky et al. ........ 455/419 |
| 5,541,977 A | 7/1996 | Hodges et al. .............. 455/411 |
| 5,550,397 A | 8/1996 | Kojima ....................... 455/412 |
| 5,561,845 A | 10/1996 | Bendixen et al. ........... 455/443 |
| 5,586,170 A | 12/1996 | Lea ............................ 455/452 |
| 5,586,338 A | 12/1996 | Lynch et al. ................ 455/433 |
| 5,590,397 A | 12/1996 | Kojima ....................... 455/414 |
| 5,603,084 A | 2/1997 | Henry, Jr. et al. .......... 455/419 |
| 5,613,204 A | 3/1997 | Haberman et al. .......... 455/432 |
| 5,613,208 A | 3/1997 | Blackman et al. .......... 455/434 |
| 5,649,291 A | 7/1997 | Tayloe ........................ 370/332 |
| 5,655,218 A | 8/1997 | Smolinske .................. 455/566 |
| 5,711,001 A | 1/1998 | Bussan et al. ............... 455/432 |
| 5,734,980 A | 3/1998 | Hooper et al. .............. 455/434 |
| 5,751,707 A | 5/1998 | Voit et al. ................... 370/384 |
| 5,754,542 A | 5/1998 | Ault et al. .................. 361/119 |
| 5,754,952 A | 5/1998 | Hodges et al. .............. 455/411 |
| 5,761,618 A | 6/1998 | Lynch et al. ................ 455/419 |
| 5,768,380 A | 6/1998 | Rosauer et al. ............. 380/273 |
| 5,790,952 A | 8/1998 | Seazholtz et al. ........... 455/432 |
| 5,815,808 A | 9/1998 | Valintine .................... 455/422 |
| 5,819,178 A | 10/1998 | Cropper ...................... 455/433 |
| 5,832,367 A | 11/1998 | Bamburak et al. ............ 455/62 |
| 5,845,198 A | 12/1998 | Bamburak ................. 340/7.43 |
| 5,848,097 A | 12/1998 | Carney et al. .............. 370/219 |
| 5,862,471 A | 1/1999 | Tidemann, Jr. et al. ..... 455/406 |
| 5,862,490 A | 1/1999 | Sasuta et al. ................ 455/525 |
| 5,884,157 A | 3/1999 | Karmi ........................ 455/406 |
| 5,905,955 A | 5/1999 | Bamburak et al. .......... 455/434 |
| 5,912,882 A | 6/1999 | Yafuso et al. ............... 370/270 |
| 5,915,214 A | 6/1999 | Reece et al. ................ 455/406 |
| 6,016,427 A | 1/2000 | Barber et al. ............... 455/434 |
| 6,085,085 A | 7/2000 | Blakeney, II et al. ....... 455/426 |
| 6,148,198 A * | 11/2000 | Anderson et al. ............ 455/432 |
| 6,163,695 A * | 12/2000 | Takemura ................... 455/422 |
| 6,173,181 B1 * | 1/2001 | Losh .......................... 455/434 |
| 6,212,392 B1 * | 4/2001 | Fitch et al. .................. 455/456 |
| 6,246,874 B1 * | 6/2001 | Voce .......................... 455/428 |

\* cited by examiner

FIG. 5

| | | |
|---|---|---|
| C1 | 101 | 201 |
| C2 | 102 | 202 |
| C3 | 103 | 203 |
| C4 | 104 | 204 |
| C5 | 105 | 205 |
| C6 | 106 | 206 |
| C7 | 107 | 207 |
| C8 | 108 | 208 |
| C9 | 109 | 209 |
| C10 | 110 | 210 |
| C11 | 111 | 211 |
| C12 | 112 | 212 |
| C13 | 113 | 213 |
| C14 | 114 | 214 |
| C15 | 115 | 215 |
| C16 | 116 | 216 |
| C17 | 117 | 217 |
| C18 | 118 | 218 |
| C19 | 119 | 219 |
| C20 | | 220 |
| C21 | | 221 |
| C22 | | 222 |
| C23 | | 223 |
| C24 | | 224 |
| C25 | | 225 |
| C26 | | 226 |
| C27 | | 227 |
| C28 | | 228 |
| C29 | | 229 |
| C30 | | 230 |
| ⋮ | ⋮ | ⋮ |
| C31 | | 231 |
| C32 | | 232 |
| C33 | | 233 |
| C34 | | 234 |
| C35 | | 235 |
| C36 | | 236 |
| C37 | | 237 |
| C38 | | 238 |
| C39 | | 239 |
| C40 | | 240 |
| C41 | | 241 |
| C42 | | 242 |
| C43 | | 243 |
| C44 | | 244 |
| C45 | | 245 |
| C46 | | 246 |
| C47 | | 247 |
| C48 | | 248 |
| C49 | | 249 |
| C50 | | 250 |
| C51 | | 251 |
| C52 | | 252 |
| C53 | | 253 |
| C54 | | 254 |
| C55 | | 255 |
| C56 | | 256 |
| C57 | | 257 |
| C58 | | 258 |
| C59 | | 259 |
| C60 | | 260 |
| C61 | | 261 |

MOBILE STATION ROAMING IN A MULTIPLE SERVICE PROVIDER AREA

This application is a continuation of Ser. No. 09/135,299 filed Aug. 17, 1998.

FIELD OF THE INVENTION

The invention relates generally to roaming in a wireless communication network. More particularly, the invention relates to controlling roaming in a geographic area in which there are multiple service providers.

BACKGROUND OF THE INVENTION

Mobile stations (e.g. wireless telephones) operate within a wireless communication network by establishing communication with base stations. These base stations generally comprise antennas and the required radio and control equipment necessary for such communication. These base stations are connected to mobile switching centers which control the operation of the base stations. The mobile switching centers may further be connected to other communication networks, such as the public switched telephone network (PSTN), the Internet, other wireless communication networks, or other types of communication networks. The architecture of such wireless communication networks is well known.

Each base station serves a geographic area called a cell. Thus, when a mobile station is operating within a given cell it establishes communication with the base station serving that cell. As a mobile station moves about the geographic coverage area of the wireless network, it may be necessary to establish communication with various base stations. For example, during a voice call, a mobile station may leave the current serving cell and enter an adjacent cell. In order for the voice call to continue uninterrupted, it is necessary to transfer communication from a voice channel of the current serving cell base station to a voice channel of the base station of the adjacent cell into which the mobile station is moving. Such a procedure is called a handoff and is well known in the art of mobile wireless communications.

When a mobile station is turned on and registered with the wireless network, but not actively being used for a voice call, the mobile station is in communication with the serving base station via that base station's control channel. When a mobile station is communicating with a control channel, the mobile station is said to be "camped on"to the control channel. It is via this control channel that the base station can notify the mobile station that communication is requested (e.g. there is an incoming telephone call for the mobile station). It is also via this control channel that a mobile station can notify the base station that communication is requested (e.g. the mobile station requests a voice channel for an outgoing telephone call).

In a manner similar to that described above with respect to voice calls, when the mobile station is registered but not currently being used for communication, the mobile station may be moving about the coverage area of the wireless communication network.

In order for the mobile station to remain actively registered with the wireless communication network, it is necessary to transfer communication from the control channel of the current serving cell base station to the control channel of the base station of the adjacent cell into which the mobile station is moving. Such a procedure is called reselection and is well known in the art of mobile wireless communications.

In the current wireless communications environment, it is common for there to be multiple service providers providing wireless communication services within the same geographic area. When a subscriber subscribes for wireless service with a service. provider, that service provider is the primary service provider for that subscriber's mobile station. Thus, when the subscriber's mobile station is operating in a geographic area in which the primary service provider and some other service provider (i.e. a secondary service provider) both provide wireless services, it is preferable for the mobile station to use the primary service provider for service. If, however, the mobile station is operating in an area in which the primary service provider does not provide service, it may be desirable for the mobile station to obtain service from some secondary service provider. When a mobile station obtains service from a service provider other than its primary service provider, that mobile station is roaming. The roaming process is controlled by the mobile station's control processor executing program code which implements the desired roaming algorithms.

Currently, there are many geographic areas in which the coverage area of multiple wireless service providers overlap. Consider the geographic area shown in FIG. 1 which is served, at least in part, by two service providers, A and B. Assume that service provider A is the primary service provider for a particular mobile station and that service provider B is a secondary service provider for the mobile station. This is a common situation where, for example, coverage area 102 is a densely populated urban area, and coverage area 104 is a somewhat less populated suburban area. In this case, secondary service provider has base stations (indicated in FIG. 1 with a B) throughout both coverage areas 102 and 104, while primary service provider A only has base stations (indicated in FIG. 1 with an A) in the more densely populated coverage area 102. In such a situation, service provider A will generally have an agreement with service provider B such that service provider A's subscribers can obtain service from service provider B while roaming in coverage area 104. However, when such a subscriber is within coverage area 102, the mobile station should register with service provider A base stations.

A problem with mobile station roaming exists where there are coverage holes in the coverage area 102 with respect to service provider A. A coverage hole is an area within the serving area of the service provider in which a mobile station cannot receive acceptable service from the service provider. Coverage holes may exist for various reasons. For example, there may be a geographic area which, because of terrain and base station antenna locations, cannot receive sufficiently strong signals for service (e.g. a geographic coverage hole). Other coverage holes may exist because of buildings, for example parking garages. Another example of a coverage hole may be an elevator. When a mobile station moves into a coverage hole, it is often the case that the mobile station will emerge from the coverage hole within a short period of time.

The problem with coverage holes in multiple service provider environments is illustrated by the following example in conjunction with FIG. 1. Consider a service provider A coverage hole 106 within coverage area 102. Assume this is a geographic coverage hole, such that when a mobile station enters this coverage hole 106, the mobile station will emerge from the coverage hole within one minute. However, because of the roaming procedures the mobile station follows, when the mobile station detects that it can no longer receive service from primary service provider A, it will initiate its roaming process. Assuming that coverage hole 106 is only a coverage hole for service provider A, and not for service provider B, then the mobile station will reselect to a control channel of a service provider B base station and thus the mobile station will now be registered with service provider B. This is an undesirable result for several reasons.

When a mobile station is registered with a service provider, a display on the mobile station will identify the service provider providing the service. Thus, when a mobile station is registered with service provider A in coverage area 102, the display will read, for example, —Home Area— Service Provider A—. When the mobile station is registered with service provider B in coverage area 104, the display will read, for example, —Extended Area—Service Provider B—. In these two situations, the display would be as expected by the subscriber. However, if the mobile station enters coverage hole 106 and reselects to service provider B, the display will change to read—Extended Area—Service Provider B—. This may be confusing to the subscriber because the subscriber thinks he/she is still within the primary service provider area. Further, some of the features, which the subscriber expects to receive while in coverage area 102, will not be available to the subscriber while registered with service provider B. Also, the quality of the service provided will be beyond the control of the primary service provider A.

Thus, a solution to this problem would benefit both service providers and subscribers.

SUMMARY OF THE INVENTION

In view of the problems discussed above, it has been recognized that it is preferable that a mobile station which enters a coverage hole within the coverage area of the mobile station's primary service provider be temporarily without service, rather than the mobile station reselecting to a secondary service provider. In accordance with the invention, when a mobile station determines that acceptable service is no longer available from the primary service provider, it will only reselect to a secondary service provider if the mobile station is on the periphery of the coverage area of the primary service provider. If the mobile station is not on the periphery of the coverage area of the primary service provider, then it is assumed that the mobile station has entered a coverage hole and the mobile station will be prevented from reselecting to a secondary service provider a time period. This will allow the mobile station sufficient time to emerge from the coverage hole.

In accordance with one embodiment of the invention, the mobile station determines whether it is at the periphery of the primary service provider coverage area by examining the neighbor list of control channels being transmitted by the current serving base station. If the neighbor list of the current serving base station contains only identifications of the primary service provider control channels, then a determination is made that the mobile station is operating in the interior of the primary service provider coverage area. Alternatively, if the neighbor list of the current serving base station contains at least one identification of a non-primary service provider control channel, then a determination is made that the mobile station is operating on the periphery of the primary service provider coverage area.

In other embodiments, the mobile station determines whether it is at the periphery of the primary service provider coverage area by analyzing other information sent from the serving base station. Such information can include the cell identification transmitted by the base station, or other indicia indicating whether the cell is a periphery cell.

These and other advantages of the invention will be apparent to those of ordinary skill in the art by reference to the following detailed description and the accompanying drawings.

BRIEF DESCRIPTION OF THE DRAWINGS

FIG. 5 is a table showing exemplary control channels used by wireless service providers.

DETAILED DESCRIPTION

Figure 1:
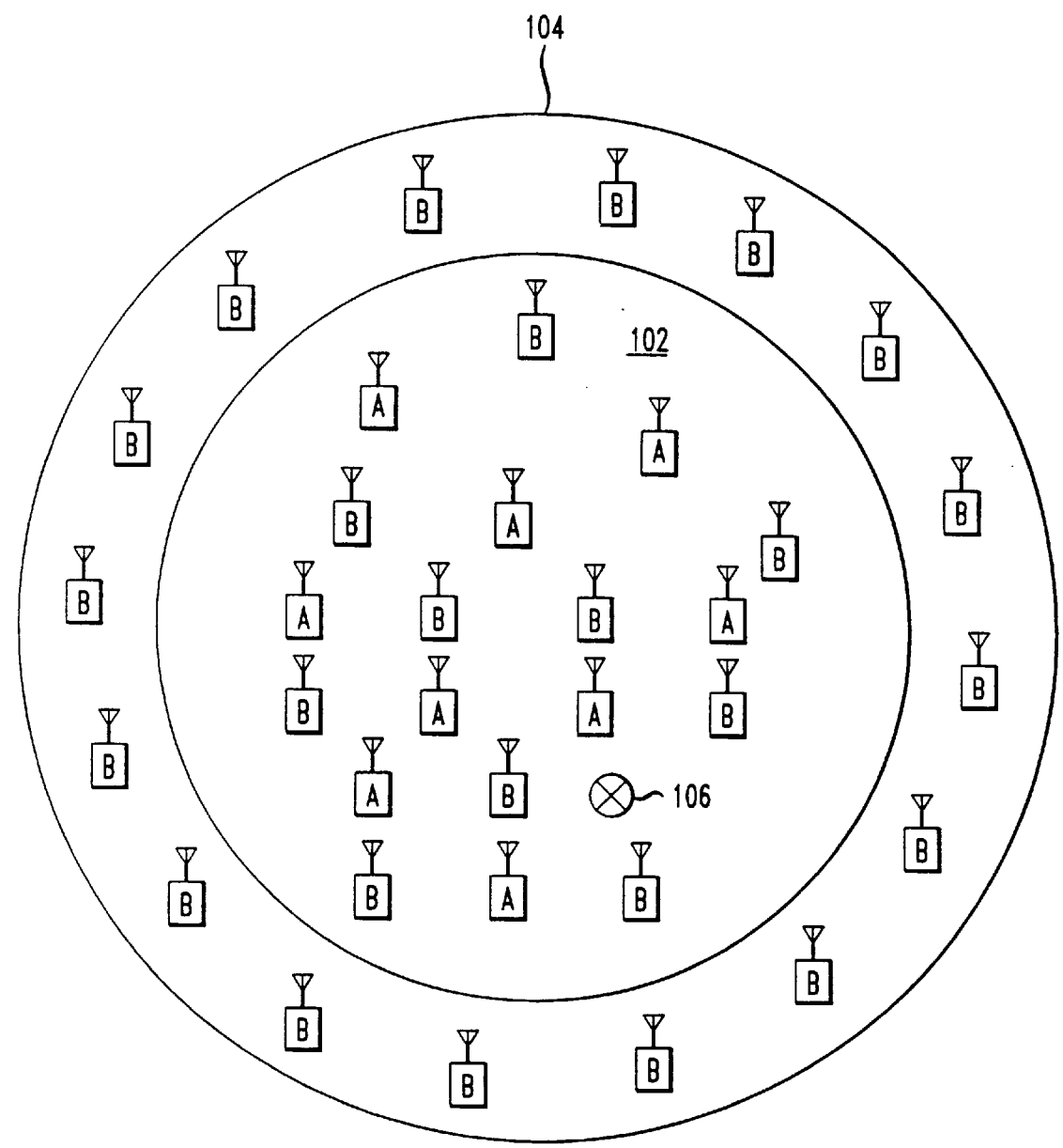
FIG. 1 shows a cellular communication network coverage area.
Figure 2:
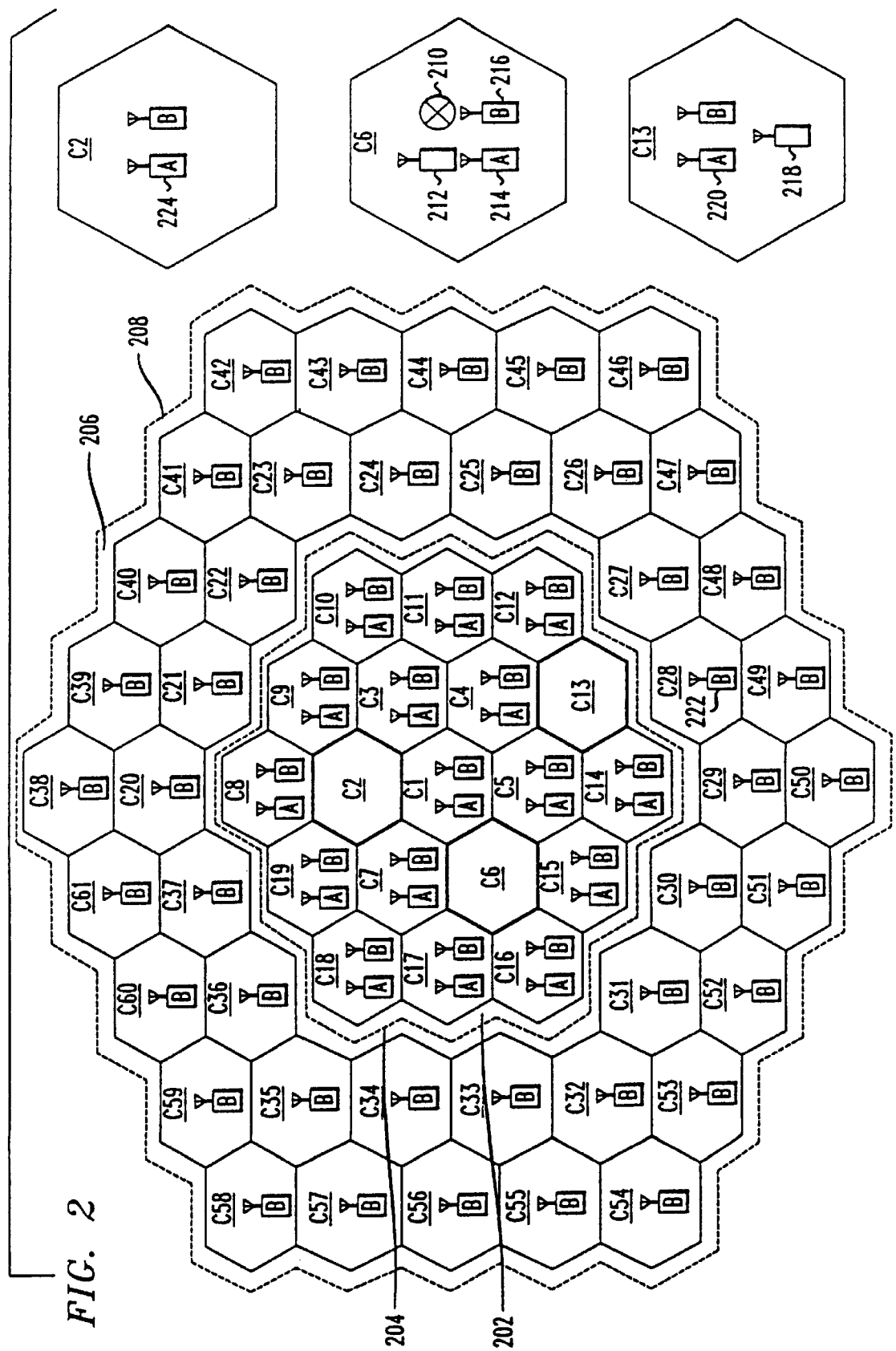
FIG. 2 shows a cellular communication network coverage area layout in which the principles of the present invention may be used.

FIG. 2 shows a cellular communication network layout in which the principles of the present invention may be used. The geographic area is divided into 61 hexagonal cells C1 through C61. Cells C1 through C19 represent a geographic area which is served by two service providers, service provider A and service provider B. This coverage area will be referred to as coverage area 202 and is enclosed by broken line 204. Thus, each cell C1 through C19 contains a base station operated by service provider A (identified in FIG. 1 with an A) and a base station operated by service provider B (identified in FIG. 1 with a B). It is noted that the hexagonal cell configuration of cells C1 through C19 are considered to be the same for both service provider A and service provider B for ease of illustration, but in reality the cell configuration of service providers A and B could be different. Also, although each cell is shown as having two base stations, one associated with each service provider, it is also possible that some or all of the base stations could be shared by the service providers, such that a cell may have only one base station. Cells C20 through C61 represent a geographic area which is served only by service provider B. This coverage area will be referred to as coverage area 206 and is enclosed by broken line 208. Thus, each cell C20 through C61 contains a base station operated by service provider B.

To illustrate the principles of the present invention, two reselection situations will be considered. First, assume a mobile station 212 operating in cell C6. Also assume that mobile station 212 is registered with service provider A, which is the mobile'station's primary service provider, and is communicating with service provider A via the control channel of base station 214. Cell C6 has a geographic coverage hole 210 with respect to service provider A, but the signal from service provider B, via base station 216, reaches coverage hole 210. When mobile station 212 enters coverage hole 210, it is preferable for mobile station 212 to be without service for the short time it is in coverage hole 210, rather than have the mobile station 212 reselect to service provider B. Alternatively, consider mobile station 218 operating in cell C13. Again, also assume that mobile station 218 is registered with service provider A, which is the mobile station's primary service provider, and is communicating with service provider A via the control channel of base station 220. If mobile station 218 is moving toward cell C28 it will reach a point where it can no longer obtain an acceptable signal from service provider A. In this situation, it is desirable for mobile station to 218 to reselect to the service provider B's control channel of base station 222 in cell C28. This situation is different because the inability to obtain service from primary service provider A is not a temporary result of a coverage hole, but instead is a result of the mobile station 218 leaving the coverage area 202 of service provider A. This is precisely the benefit of allowing a mobile station to roam between service providers, because without such roaming, the mobile station 218 would be without service.

In accordance with the principles of the present invention, the two situations are distinguished by determining when a mobile station is operating on the periphery of a primary service provider coverage area and only allowing the mobile station to reselect to another service provider (i.e. roam) if the mobile station is operating on the periphery of the primary service provider coverage area. If the mobile station is not operating on the periphery of the primary service provider coverage area, then the mobile station will be prevented from roaming for a period of time which would be sufficient in most situations to allow the mobile station to exit the coverage hole and re-obtain service from the primary service provider. As used herein, a periphery cell of a service provider is a cell which has at least a portion of its border not adjacent to another cell of that service provider. Thus, with respect to the cell configuration illustrated in FIG. 2, cells C8 through C19 are periphery cells for service provider A, while cells C1 through C7 are not periphery cell, herein referred to as interior cells for service provider A. Further details of the principles of the present invention, including several embodiments utilizing various techniques for determining whether a mobile station is operating at the periphery of the service provider coverage area, are discussed below.

Figure 3:
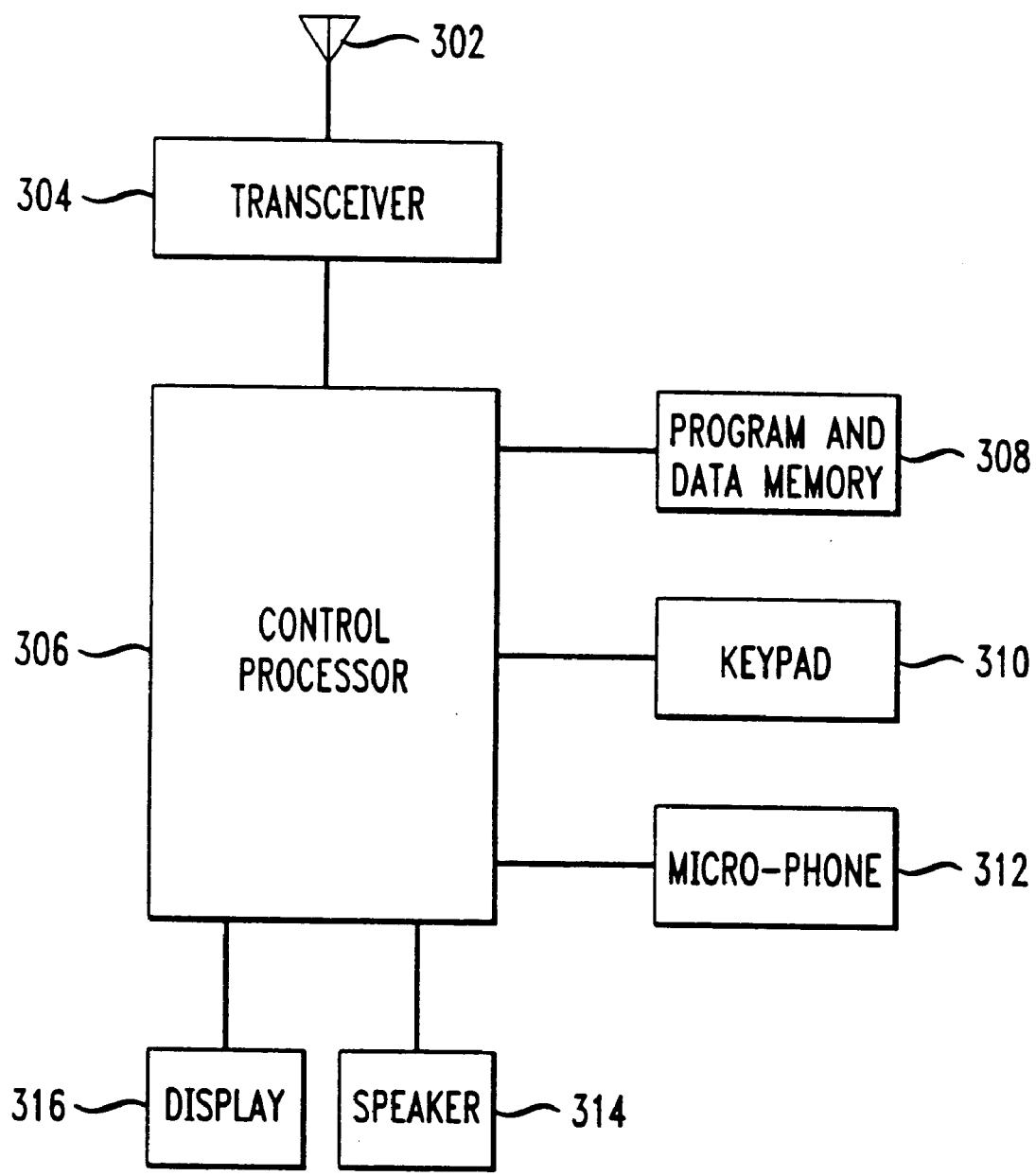
FIG. 3 shows a block diagram of the components of a mobile station configured in accordance with the present invention.

FIG. 3 shows a block diagram of the components of a mobile station 300 configured in accordance with the present invention. Mobile station 300 includes a transceiver 304 which sends and receives signals from antenna 302. The overall functioning of the mobile station 300 is controlled by a control processor 306 which operates by executing computer program instructions which are stored in program and data memory 308. It is these program instructions which define the overall operation of the mobile station 300. Program and data memory 308 also stores other data which is necessary for the operation of the mobile station 300, such as user preferences, user telephone number, communication provider identification, and mobile station identification. Although FIG. 3 shows program and data memory 308 as one component, it would be recognized by one skilled in the art that program and data memory 308 could also be implemented with separate memory units.

Mobile station 300 also includes a keypad 310 to allow a user to communicate with control processor 306. Sound information to be transmitted by the mobile station 300 is received via microphone 312 and sound information received by the mobile station 300 is played to the user via speaker 314. The mobile station 300 also includes a display 316 to allow the control processor 300 to display alphanumeric data to the user. It is to be understood that the block diagram is for illustrative purposes only. The design and operation of mobile stations are well known in the art and various modifications are possible.

Figure 4:
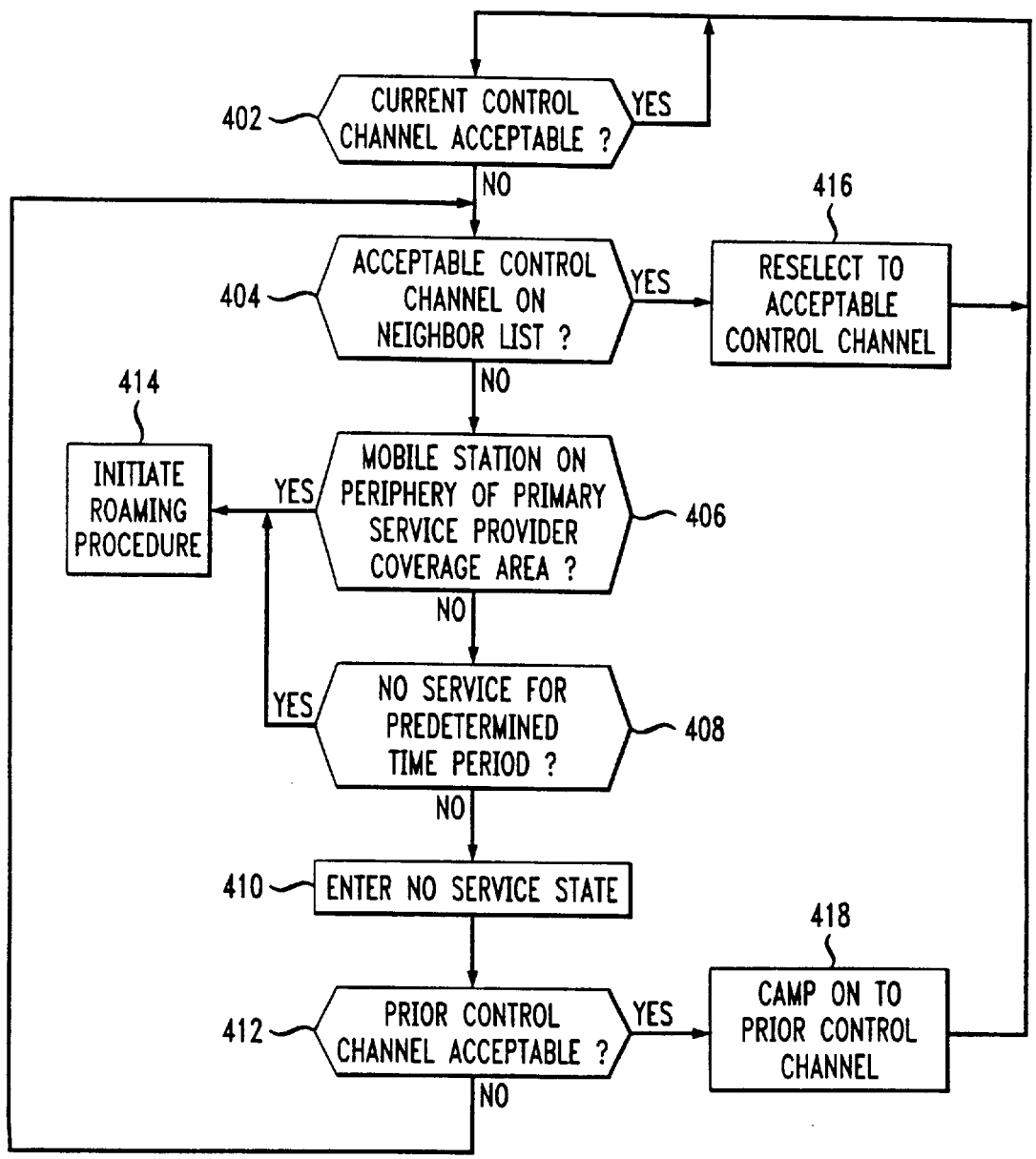
FIG. 4 is a flowchart of the steps performed by a mobile station in accordance with the present invention.

The steps performed by a mobile station in accordance with the present invention will be described in conjunction with the flowchart of FIG. 4. These steps are performed under control of a control processor executing computer program instructions as illustrated in conjunction with FIG. 3. In step 402, the mobile station monitors the signal quality of the current control channel of the primary service provider and determines whether the control channel is acceptable. If the control channel is acceptable, then the mobile station continues to perform step 402 to determine whether the signal remains acceptable. If the signal quality is not acceptable, then control passes to step 404. In step 404 the mobile station determines whether there is an acceptable control channel on the neighbor list of the current serving base station. A neighbor list is a list, broadcast by each base station, which contains an identification of the service provider's control channels in the cells adjacent to that base station. With reference to FIG. 2, the neighbor list transmitted by the base station 224 of cell C2 would include identifications of the service provider A control channels in cells C8, C9, C3, C1, C7, and C19. FIG. 5 is a table showing exemplary control channels used by service providers A and B in cells C1 through C61. As shown in FIG. 5, service provider A uses control channels 101 through 119 in cells C1 through C19, respectively. Service provider A does not provide service in cells C20 through C61 and therefore has no control channels in those cells. Service provider B uses control channels 201 through 261 in cells C1 through C61, respectively. Returning now to the example, the neighbor list transmitted by primary service provider A base station 224 of cell C2 would be {108, 109, 103, 101, 107, 119}.

Returning now to FIG. 4, if in step 404 the mobile station finds an acceptable control channel on the neighbor list, then in step 416 the mobile station reselects to the new control channel of the primary service provider on the neighbor list and control returns to step 402.

If in step 404 the mobile station finds no acceptable control channel on the neighbor list, then in step 406 the mobile station determines whether it is operating at the periphery of the coverage area of the primary service provider. Various embodiments for performing step 406 will be discussed in further detail below. If the mobile station determines in step 406 that it is not operating on the periphery of the primary service provider coverage area, then control passes to step 408. At this point, an assumption is made that the mobile station has entered a temporary coverage hole. In such a situation, the mobile station is prevented from reselecting to a secondary service provider for a predetermined time period because it is assumed that the mobile station will emerge from the coverage hole within a relatively short time period and be able to re-obtain service from the primary service provider. Accordingly, in step 408 it is determined whether the mobile station has been without service for a predetermined time period. This time period is a settable parameter in the mobile station and is set to a time period which would generally be enough time for a mobile station to emerge from a coverage hole. For example, the time period may be set to 10 minutes. If the time period has not expired, then the mobile station enters a no service state in step 410. Control passes to step 412 at which point the mobile station will determine whether the signal on the prior used control channel has become acceptable (i.e. the mobile station has emerged from the coverage hole). If the prior control channel is now acceptable, control passes to step 418 in which the mobile station camps on to the prior control channel of the primary service provider and control returns to step 402. If in step 412 the mobile station determines that the signal on the prior used control channel has not become acceptable (i.e. the mobile station has not emerged from the coverage hole), then control passes to step 404 where the mobile station will again evaluate the neighbor list for an acceptable control channel.

Returning now to step 406, if the mobile station determines in step 406 that it is operating on the periphery of the primary service provider coverage area, then control passes to step 414. At this point, an assumption is made that the mobile station is leaving the coverage area of the primary service provider and that it is appropriate for the mobile station to roam and obtain service from. a secondary service provider. Accordingly, in step 414 the mobile station initiates its roaming procedure. Advantageously, the roaming procedure can be performed in an "intelligent" manner, such that the mobile station will make a decision as to which service provider to obtain service from based on some stored algorithm and data. The details of such an intelligent roaming algorithm are not the subject of this description and will not be described in detail herein. For a description of an appropriate roaming algorithm see U.S. patent application Ser. No. 08/969,710, entitled Method for Selecting a Wireless Communications Service Provider in a Multi-Service Provider Environment, filed Oct. 29, 1997, and which is incorporated herein by reference.

Returning now to FIG. 4, if in step 408 it is determined that the mobile station has been without service for a predetermined time period, a decision is made to allow the mobile station to roam and obtain service from a secondary service provider. Accordingly, control passes to step 414.

Returning now to step 406, there are various ways to accomplish the step of determining whether the mobile station is operating at the periphery of the primary service provider coverage area. One such technique is to examine the neighbor list being transmitted by the current serving base station. In this embodiment, if the neighbor list of the current serving base station contains only identifications of the primary service provider control channels, then a determination is made that the mobile station is operating in the interior of the primary service provider coverage area. Alternatively, if the neighbor list of the current serving base station contains at least one identification of a non-primary service provider control channel (e.g. an identification of a secondary service provider control channel), then a determination is made that the mobile station is operating on the periphery of the primary service provider coverage area. This analysis will be further described in accordance with the following example of the steps performed in accordance with this embodiment of the invention.

In a first exemplary scenario, consider mobile station 212 operating in cell C6 and camped on to the control channel of primary service provider A base station 214. Now assume that mobile station 212 is moving and enters coverage hole 210, which is a geographic coverage hole. Mobile station 212 is moving at a rate such that it will emerge from coverage hole 210 in one minute. Referring to FIG. 4, in step 402 mobile station 212 will determine that the current control channel is not acceptable and control will pass to step 404. In step 404, mobile station 212 will determine whether there are any acceptable control channels on the neighbor list. However, assume that the coverage hole will not allow the signal from any of the adjacent primary service provider A base stations to enter the coverage hole 210. Thus, since none of the control channels on the neighbor list are acceptable, control will pass to step 406.

In step 406 the mobile station 212 determines whether it is operating at the periphery of the primary service provider coverage area. As described above, in the embodiment being described, this is accomplished by analyzing the neighbor list being transmitted by the primary service provider base station. Since mobile station 212 is operating in cell C6 and was last serviced by primary service provider base station 214, the neighbor list last received by mobile station 212 will contain identification of the control channels used by the primary service provider in the cells adjacent to cell C6. Since cells C7, C1, C5, C15, C16, and C17 are adjacent to cell C6, then with reference to FIG. 5, the neighbor list received by mobile station 212 while in cell C6 will be {107, 101, 105, 115, 116, 117}. Mobile station 212 will recognize that all of these control channels are control channels of primary service provider A. One way that mobile station 212 can make such a recognition is because all control channels of service provider A are within the range 101–119, as seen from FIG. 5. Of course, there are other ways that mobile station 212 can make such a recognition, for example by storing a list in memory 308 of all control channels for service provider A. Since all of the control channels in the neighbor list are control channels of primary service provider A, then mobile station 212 determines that it is operating in the inferior of the primary service provider A coverage area, and control passes to step 408. Assuming that the time period in step 408 has not been reached, control passes to step 410 at which time the mobile station enters a no service state. Assuming that the control channel in cell C6 is still unacceptable, the test in step 412 passes control to step 404. Assume that within one minute mobile station 212 emerges from coverage hole 210. The next time control reaches step 412, the test will determine that the control channel in cell C6 is now acceptable, and control will pass to step 418 at which time the mobile station will camp on to control channel 106 of cell C6. As shown in this example, since the mobile station 212 was only in a temporary coverage hole 210, and was not leaving the coverage area of primary service provider A, the mobile station 212 was prevented from roaming. Instead, the mobile station 212 waited a short period of time and was able to re-obtain service from the primary service provider.

In a second exemplary scenario, consider mobile station 218 operating in cell C13 and camped on to the control channel of primary service provider A base station 220. Now assume that mobile station 212 is moving out of the primary service provider coverage area and toward cell C28. Referring to FIG. 4, in step 402 mobile station 218 will determine that the current control channel is not acceptable and control will pass to step 404. In step 404, mobile station 218 will determine whether there are any acceptable control channels on the neighbor list. A brief description of what the neighbor list will look like in this situation is required here. For a periphery cell, such as cell C13, the neighbor list will have identifications of control channels of the current service provider for the adjacent cells which are serviced by the current service provider. Thus, the neighbor list transmitted by base station 220 of service provider A will contain identifications of the service provider A control channels for cells C14, C5, C4, and C12. In addition, the neighbor list will contain control channels assigned to service provider B, to represent that cell C13 is also adjacent to service provider B cells C28 and C27. However, if the neighbor list contained the actual control channels used by service provider B in cells C28 and C27, namely control channels 228 and 227 respectively, then mobile station may reselect to those control channels in steps 404 and 416. This is undesirable because the mobile station should only reselect to a secondary service provider during the roaming procedure of step 414. Thus, instead of transmitting actually used service provider B control channels 228 and 227 in the neighbor list, base station 220 will transmit control channels assigned to service provider B, but not actually used in any adjacent cell, in the neighbor list. These control channels are called "dummy"control channels, and are used by service provider A to signify that a particular cell is adjacent to a service provider B cell. Thus, the neighbor list transmitted by service provider A base station 220 will be {114,105,104, 112,260,261}. Thus, the neighbor list contains actual service provider A adjacent control channels 114, 105, 104 and 112. The neighbor list also contains dummy service provider B control channels 260 and 261.

Returning now to step 404, assuming that none of the control channels on the neighbor list are acceptable, control will pass to step 406. In step 406 the mobile station determines whether it is operating at the periphery of the primary service provider coverage area. As described above, in the embodiment being described, this is accomplished by analyzing the neighbor list being transmitted by the primary service provider base station. In this example, the neighbor list contains {114,105,104,112,260,261}. Mobile station 218 will recognize that not all of these control channels are control channels of primary service provider A. More particularly, mobile station 218 will recognize that control channels 260 and 261 are not within the range of control channels for service provider A. Since not all of the control channels in the neighbor list are control channels of primary service provider A, then mobile station 218 determines that it is operating on the periphery of the primary service provider coverage area 202, and control passes to step 414. In step 414, the mobile station 218 begins its roaming procedure, at which point it will reselect to service provider B control channel 228 in cell C28.

As discussed above, there are alternate techniques for making the determination of step 406 of whether the mobile station is operating at the periphery of the primary service provider coverage area. One such alternative is to use the cell identification (CELLID) which is transmitted by each base station in the control channel. Each base station transmits a unique identifier which is assigned to that base station. The mobile station could store a list of these CELLIDs in memory 308 along with an indication as to whether the cell is a periphery cell or an interior cell. Thus, when the mobile station needs to make the step 406 determination, the mobile station will look up the CELLID transmitted by the current serving base station in its memory 308 to determine whether the cell is a periphery cell or an interior cell.

As another alternative for step 406, the base station could transmit some identification indicating that it is a periphery cell. For example, in addition to transmitting a CELLID, the base stations also transmit other information in the control channel. Each base station transmits a Private System Identification (PSID) and Residential System Identification (RSID) in the control channel. Special codes (e.g. 99999) could be set aside for either of these parameters such that the special code would indicate to the mobile station that the cell is a periphery cell.

Of course, there are various ways for the base station to indicate that it is, or is not, a periphery cell. Just a few of these techniques are described above. One skilled in the art, given the above description, could implement various techniques for step 406 without departing from the scope and spirit of the invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for controlling a mobile station located in a geographic area with a primary service provider having a coverage area that at least partially overlaps a coverage area of a secondary service provider, comprising:
   determining if at least one control channel is available from the primary service provider;
   determining if the mobile station is located at a periphery of the coverage area of the primary service provider, if at least one control channel is not available from the primary service provider; and
   preventing the mobile station from accessing a control channel from the secondary service provider, if the mobile station is not located at the periphery.

2. A method as recited in claim 1, further comprising:
   obtaining data from the primary service provider prior to determining if at least one control channel is available; and
   wherein determining if the mobile station is located at a periphery is based on the data from the primary service provider.

3. A method as recited in claim 2, wherein:
   the data is a neighbor list having a list of control channels for at least one neighboring cell; and
   wherein determining if the mobile station is located at a periphery includes evaluating the neighbor list for at least one control channel that is not a primary service provider control channel.

4. A method as recited in claim 3, wherein:
   the at least one control channel that is not a primary service provider control channel is a dummy control channel.

5. A method as recited in claim 3, further comprising:
   storing a range of primary service provider control channels; and
   wherein evaluating the neighbor list includes comparing the neighbor list to the range of primary service provider control channels.

6. A method as recited in claim 2, wherein:
   the data is a cell identification.

7. A method as recited in claim 6, further comprising:
   storing a list of periphery cells identifying at least one cell that is at the periphery of the coverage area of the primary service provider; and
   wherein determining if the mobile station is located at a periphery step includes comparing the cell identification to the list of periphery cells.

8. A method as recited in claim 2, wherein:
   the data is a special code.

9. A method as recited in claim 8, further comprising:
   storing a periphery code; and
   wherein determining if the mobile station is located at a periphery includes comparing the special code to the periphery code.

10. A method as recited in claim 1, wherein:
    the preventing step is continued for a set period of time.

11. A method for a system to determine if a mobile station is located at a periphery of a coverage area of a primary service provider, comprising:
    transmitting cell information data from the primary service provider to the mobile station;
    analyzing the cell information data for at least one periphery identification; and
    determining that the mobile station is at the periphery if there is at least one periphery identification, wherein the cell information data is a neighbor list having a list of control channels for at least one neighboring cell, and the at least one periphery identification is at least one control channel that is not a primary service provider control channel.

12. A method as recited in claim 11, wherein:

the at least one control channel that is not a primary service provider control channel is a dummy control channel.

13. A method for a system to determine if a mobile station is located at a periphery of a coverage area of a primary service provider, comprising:

transmitting cell information data from the primary service provider to the mobile station;

analyzing the cell information data for at least one periphery identification;

determining that the mobile station is at the periphery if there is at least one periphery identification; and storing a list of periphery cells identifying at least one cell located at the periphery of the coverage area, wherein the cell information data includes a cell identification, and wherein the at least one periphery identification is the cell identification if the cell identification matches at least one cell on the list of periphery cells.

14. A method for a system to determine if a mobile station is located at a periphery of a coverage area of a primary service provider, comprising:

transmitting cell information data from the primary service provider to the mobile station;

analyzing the cell information data for at least one periphery identification; and determining that the mobile station is at the periphery if there is at least one periphery identification; and storing a periphery code, wherein the cell information data includes a special code, and wherein the at least one periphery identification is the special code if the special code matches the periphery code.

15. A mobile station capable of operating by obtaining service from a primary service provider or a secondary service provider in a geographic area having at least a portion of overlapping coverage from said primary service provider and said secondary service provider, comprising:

a processor for executing a program for controlling of the mobile station;

a memory for storing the program;

the program defining the steps of:

determining if at least one control channel is available from the primary service provider;

determining if the mobile station is located at a periphery of the coverage area of the primary service provider, if at least one control channel is not available from the primary service provider; and preventing the processor from accessing a control channel from the secondary service provider, if the mobile station is not located at the periphery.

16. A mobile station as recited in claim 15, further comprising:

a transceiver adapted for receiving data from a primary service provider;

the determining if the mobile station is located at a periphery step of the program is based on the data.

17. A mobile satiation as recited in claim 16, wherein:

the data is a neighbor list having a list of control channels for at least one neighboring cell, and the determining if the mobile station is located at a periphery of the program includes evaluating the neighbor list for at least one control channel that is not a primary service provider control channel.

18. A mobile station as recited in claim 17, wherein:

the at least one control channel that is not a primary service provider control channel is a dummy control channel.

19. A mobile station as recited in claim 17, wherein:

the memory further includes a stored range of primary service provider control channels; and the evaluating the neighbor list includes comparing the neighbor list to the range of primary service provider control channels.

20. A mobile station as recited in claim 16, wherein:

the data is a cell identification;

the memory further includes a stored list of periphery cells identifying at least one cell that is located at the periphery of the coverage area of the primary service provider; and the determining if the mobile station is located at a periphery includes comparing the cell identification to the list of periphery cells.

21. A mobile station as recited in claim 16, wherein:

the data is a special code;

the memory further includes at least one stored periphery code; and the determining if the mobile station is located at a periphery includes comparing the special code to the at least one periphery code.

22. A mobile station as recited in claim 15, wherein:

the preventing the processor from accessing a control channel is continued for a set period of time.

23. A method for determining if a mobile station is located at a periphery of a coverage area of a primary service provider, comprising:

receiving cell information data from the primary service provider;

analyzing the cell information data for at least one periphery identification; and determining that the mobile station is at the periphery if there is at least one periphery identification, wherein the cell information data is a neighbor list having a list of control channels for at least one neighboring cell, and the at least one periphery identification is at least one control channel that is not a primary service provider control channel.

24. A method for determining if a mobile station is located at a periphery of a coverage area of a primary service provider, comprising:

receiving cell information data from the primary service provider;

analyzing the cell information data for at least one periphery identification;

determining that the mobile station is at the periphery if there is at least one periphery identification; and storing a list of periphery cells identifying at least one cell located at the periphery of the coverage area, wherein the cell information data includes a cell identification, and wherein the at least one periphery identification is the cell identification if the cell identification matches at least one cell on the list of periphery cells.

25. A method for determining if a mobile station is located at a periphery of a coverage area of a primary service provider, comprising:

receiving cell information data from the primary service provider;

analyzing the cell information data for at least one periphery identification; and determining that the mobile station is at the periphery if there is at least one periphery identification; and storing a periphery code, wherein the cell information data includes a special code, and wherein the at least one periphery identification is the special code if the special code matches the periphery code.

* * * * *

UNITED STATES PATENT AND TRADEMARK OFFICE
CERTIFICATE OF CORRECTION

PATENT NO.    : 6,470,182 B1
DATED         : October 22, 2002
INVENTOR(S)   : Roderick Nelson It is certified that error appears in the above-identified patent and that said Letters Patent is hereby corrected as shown below:

<u>Title page,</u>
Item [73], Assignee, please change "AT&T Wireless Service, Inc." to
-- AT&T Wireless Services, Inc. --

Signed and Sealed this

Thirteenth Day of May, 2003

JAMES E. ROGAN
*Director of the United States Patent and Trademark Office*